Sept. 10, 1957

H. B. NOYES 2,805,675

CURRENCY DISPENSING SYSTEM

Filed June 12, 1950

INVENTOR.
Hiland B. Noyes
BY
Foorman L. Mueller
Atty.

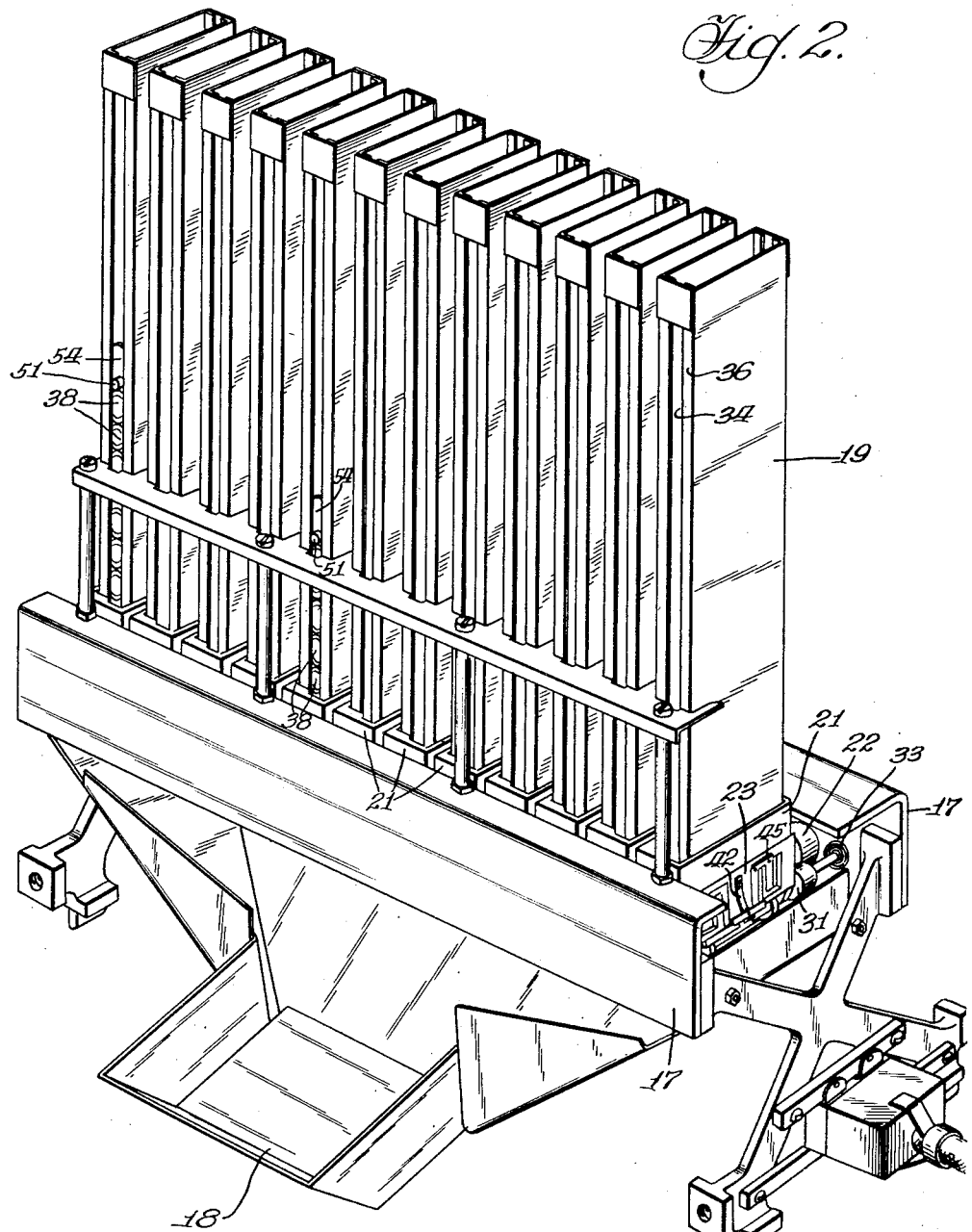

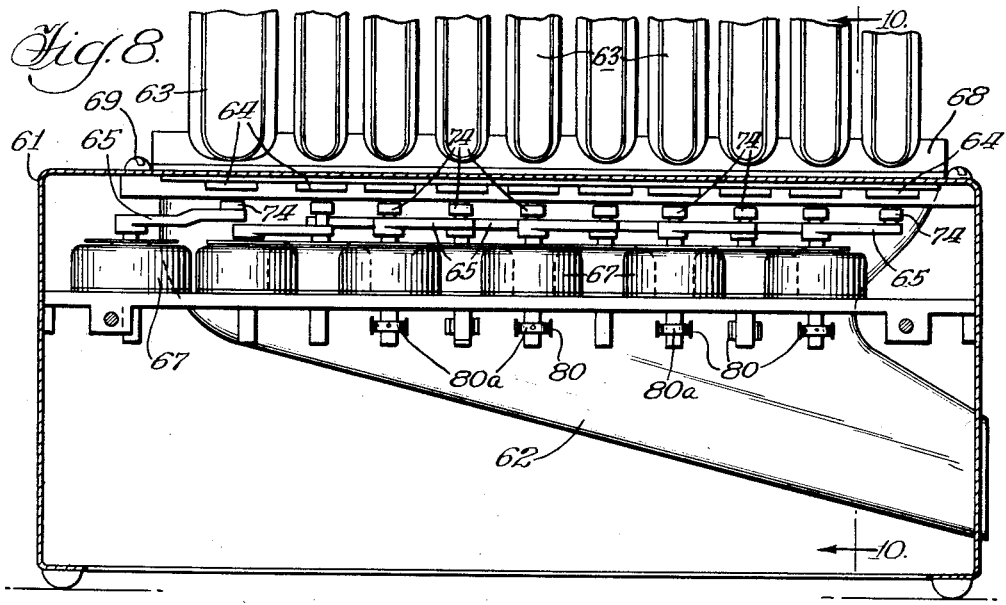
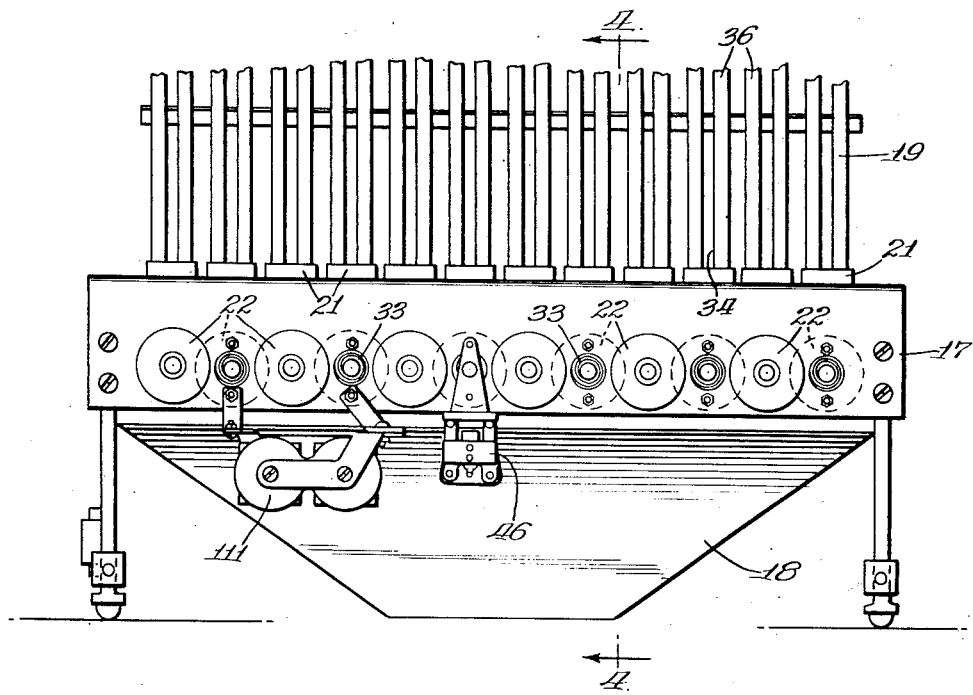

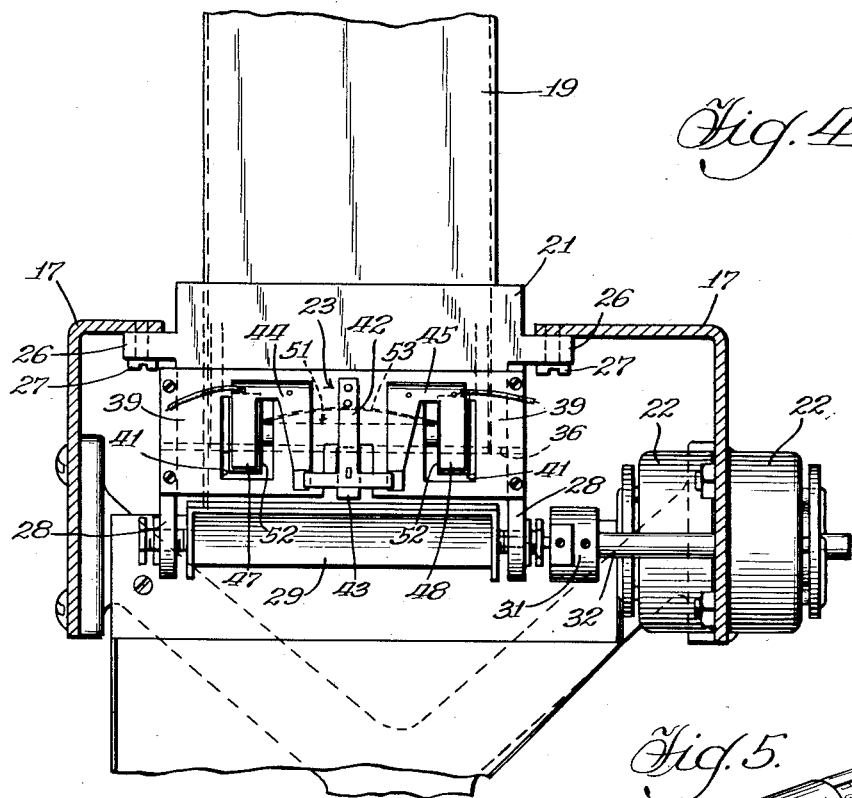
Fig. 4.
Fig. 5.
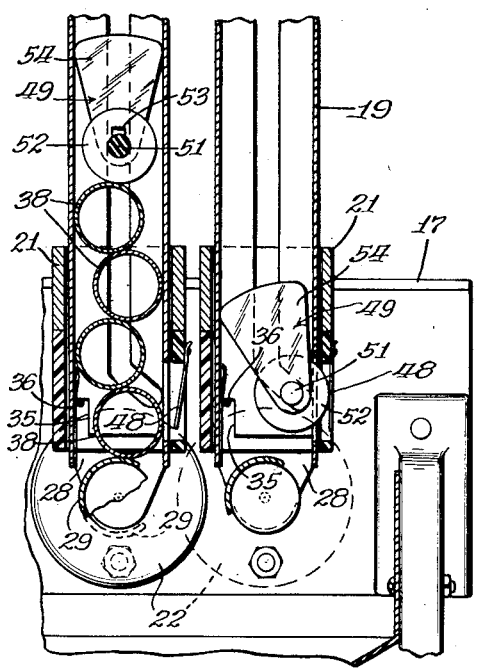
Fig. 6.
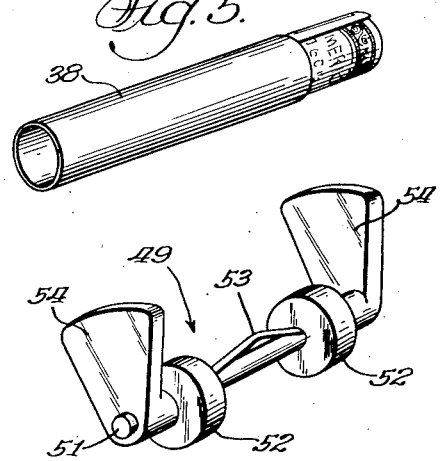
Fig. 7.
INVENTOR.
Hiland B. Noyes
BY
Thurman L. Mueller
Atty.

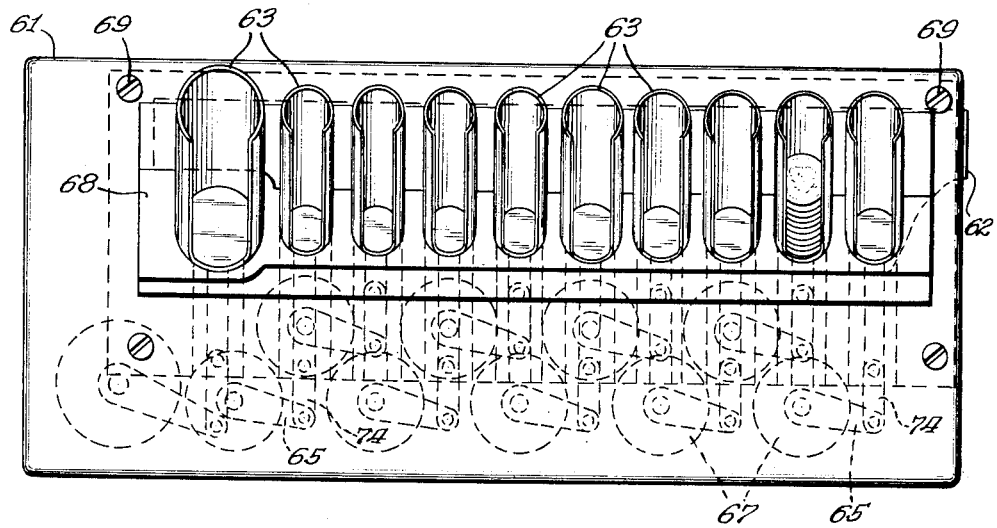
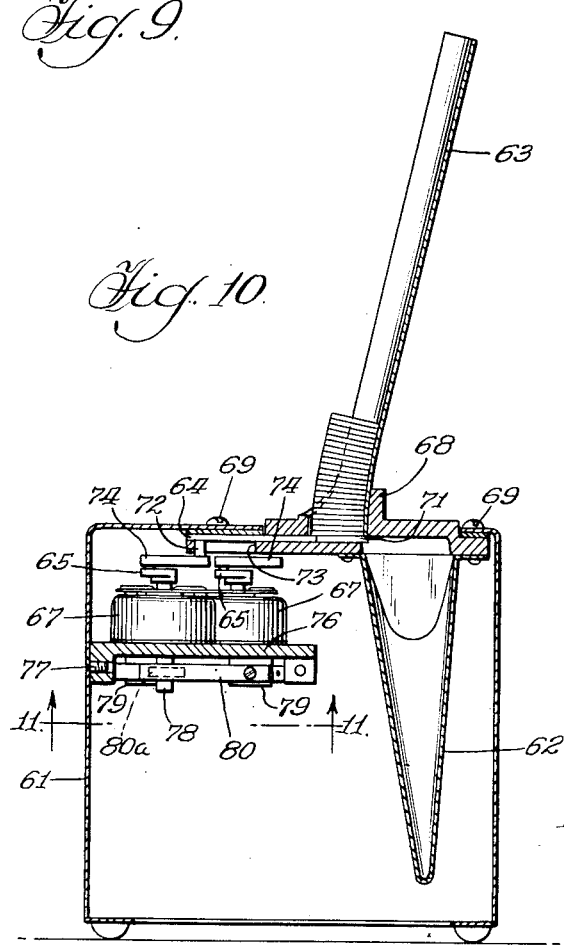
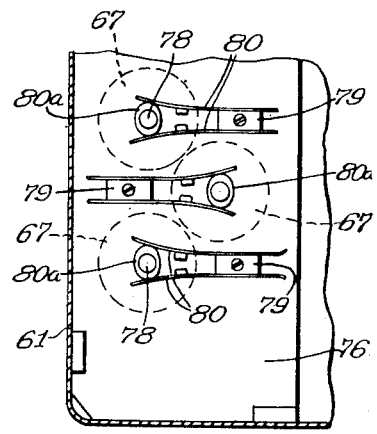

Sept. 10, 1957
H. B. NOYES
2,805,675
CURRENCY DISPENSING SYSTEM
Filed June 12, 1950
7 Sheets-Sheet 6
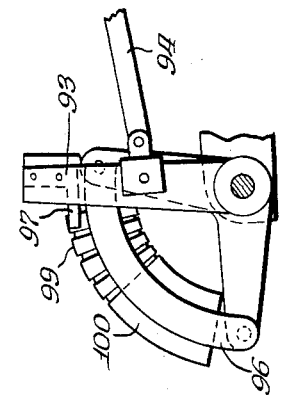
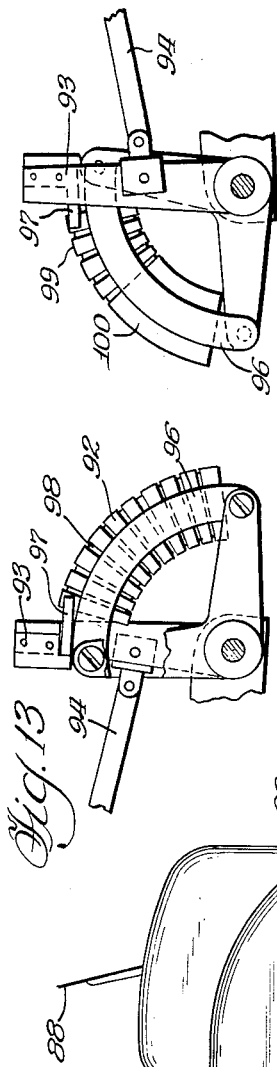
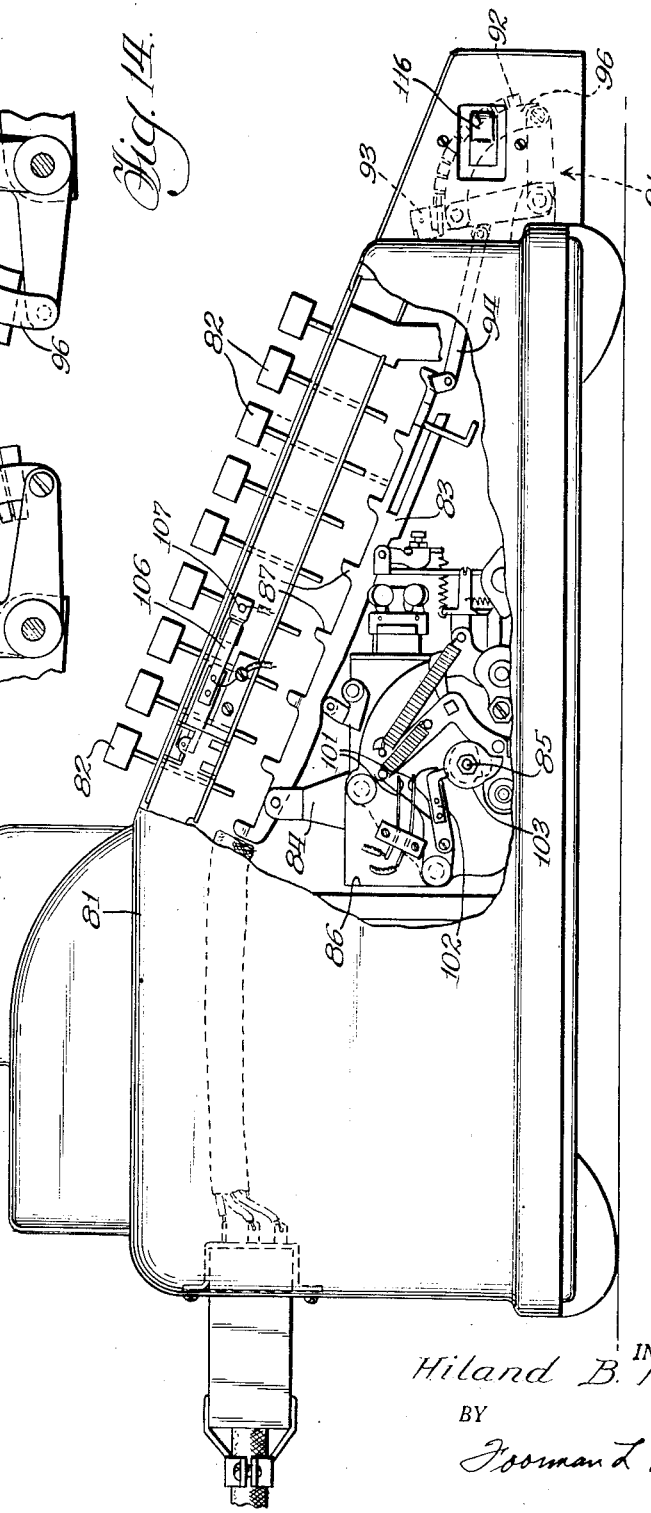
INVENTOR.
Hiland B. Noyes
BY
Fooman L. Mueller
Atty.

United States Patent Office 2,805,675
Patented Sept. 10, 1957

2,805,675

CURRENCY DISPENSING SYSTEM

Hiland B. Noyes, Western Springs, Ill., assignor to Noyes and Fies, Western Springs, Ill., a partnership composed of Hiland B. Noyes and Emerson E. Fies Application June 12, 1950, Serial No. 167,607

6 Claims. (Cl. 133—4)

This invention relates generally to a currency dispensing system. More particularly, the invention relates to a system for dispensing paper and/or coin currency, and recording the amounts dispensed.

In the past, a considerable amount of time of bank tellers, cashiers in restaurants and grocery stores, and the like, has been taken up with the dispensing of paper currency. For example, if a bank teller desired to pay a sum of currency involving paper bills it was necessary for the teller to count out the desired sum of paper currency manually, and to provide the desired accuracy, it has been common practice for tellers to count such paper currency twice. Therefore, a great deal of time of the teller has been taken up in counting out the paper currency, and this seriously limited the number of accounts that such a person could handle within a given period of time. It is obvious from the above that an automatic dispensing system which operates reliably to dispense currency in the form of paper bills will result in a great saving of time of such a teller or other person who must pay out money.

Although paper currency dispensing apparatus has been proposed in the prior art, such apparatus has not been commercially satisfactory because it has been unduly complex and expensive and has not been sufficiently reliable in operation to be acceptable. Coin dispensing devices are being used commercially and have been generally satisfactory. There is however, a need for a dispensing system for handling paper and/or coin currency and for providing a record of the amount of currency of either or both types which has been dispensed.

It is therefore one object of the invention to provide an improved currency dispensing system which is of simple and inexpensive construction and which is rapid and reliable in operation.

Another object of the invention is to provide an automatically operated dispensing system for dispensing desired amounts of paper and/or coin currency, and recording the amounts dispensed.

Still another object of the invention is to provide a currency dispensing system in which a standard adding machine forms the basis for the control device of the system.

A further object of the invention is to provide a paper currency dispensing system which is easy to operate, and which is of such construction that the possibility of errors in the amount of currency delivered is reduced to a minimum.

A still further object of the invention is to provide an apparatus for dispensing compact packages of paper currency comprising cylindrical containers with rolled paper money of different denominations therein.

A feature of this invention is the provision of a relatively inexpensive currency dispensing system utilizing a standard adding machine or similar machine with relatively simple modifications as the control unit of the system, and including currency dispensing apparatus for containing currency and dispensing the same in accordance with the amounts tabulated on the adding machine. The control unit includes means cooperating with movable parts of the adding machine for operating the dispensing apparatus and may be operative to dispense amounts in accordance with the individual amounts tabulated, total amounts, or differences, in accordance with the specific construction of the system.

Another feature of this invention is the provision of a currency dispensing system in which switch means are mechanically connected to an adding machine and electrically connected in a circuit for releasing currency from currency dispensing apparatus. The switch means provides signals in the electrical circuit corresponding to movement of members of the adding machine which in turn correspond to amounts set up in the machine, and the electrical circuit operates through solenoid means on the currency dispensing apparatus to provide currency in the amount which is set up in the machine.

A further feature of the invention is the provision of paper currency dispensing apparatus including a plurality of receptacles for containing a plurality of compact packages of paper currency arranged in groups of different denominations, and movable gate means coacting with the receptacles and with a control device for dispensing the desired amount of paper currency. The receptacles may include removable magazines and lockout switch means for preventing operation of the control device when a magazine is removed or is empty.

A still further feature of the invention is the provision of a control device for use in a currency dispensing system including a standard adding machine having electric switch means coacting with movable parts thereof for converting the mechanical movement of the parts to electric signals indicative of the quantities tabulated on the machine. Additional switch means may be included to provide selective controls for various desired modes of operation.

Other objects, features, and many of the attendant advantages of this invention will be better appreciated as the same becomes understood from the following detailed description considered in connection with the accompanying drawings, wherein:

Fig. 2 is a perspective view of a paper currency dispensing apparatus comprising a part of the invention;

Fig. 3 is a back elevational view of the paper currency dispensing apparatus;

Fig. 4 is a cross sectional view of the apparatus taken through plane 4—4 of Fig. 3;

Fig. 5 is a perspective view of one of the compact packages of paper money dispensed by the apparatus;

Fig. 6 is a fragmentary sectional view of the paper currency dispensing apparatus;

Fig. 7 is a perspective view of a follower carried within receptacles comprising a part of the apparatus for receiving compact packages of paper currency;

Fig. 8 is a back elevational view of the coin dispensing apparatus comprising a part of the currency dispensing system;

Fig. 9 is a plan view of the coin dispensing apparatus;

Fig. 10 is a cross sectional view of the coin dispensing apparatus taken through plane 10—10 of Fig. 8;

Fig. 11 is a fragmentary sectional view of the coin dispensing apparatus as viewed upwardly from a position on the plane 11—11 of Fig. 10;

Fig. 12 is a side elevational view, partly in section, showing a standard adding machine modified to include an electric signal developing means, and comprising a part of the invention;

Fig. 13 is an elevational view of one side of an electric switch mechanism adapted to be mounted on the adding machine shown in Fig. 12;

Fig. 14 is an elevational view of the remaining side of the electric switch mechanism shown in Fig. 12;

In practicing the invention, a system is provided for dispensing currency in accordance with amounts recorded on a machine having keys for setting up predetermined amounts to be tabulated. The machine includes control means for controlling the tabulation and printing of said amounts, actuating means for causing the amounts tabulated to be combined and the combined amounts to be printed, and movable members which move in a manner corresponding to the amounts tabulated, and the amounts combined. The system includes dispensing apparatus having a plurality of receptacle portions for holding currency of different denominations, and movable gate means for dispensing currency from the receptacle portions. For controlling the dispensing of currency from said apparatus in amounts set up on the machine, transmitting means are provided operatively interconnecting the movable members of the machine and the gate means of the dispensing apparatus. The transmitting means includes electric switch means mechanically connected to the movable members, and included in an electrical circuit for developing an electric signal representing the selected quantity which is selectively applied to solenoid means mechanically connected to the movable gate means. Selecting switch means mechanically connected to the actuating means may be included in the circuit for rendering the transmitting means operative only during certain movements of the movable members. And, lockout switch means may also be provided for rendering the system inoperative when a removable magazine forming a part of the receptacle portions is removed or empty.

Figures 1, 15:
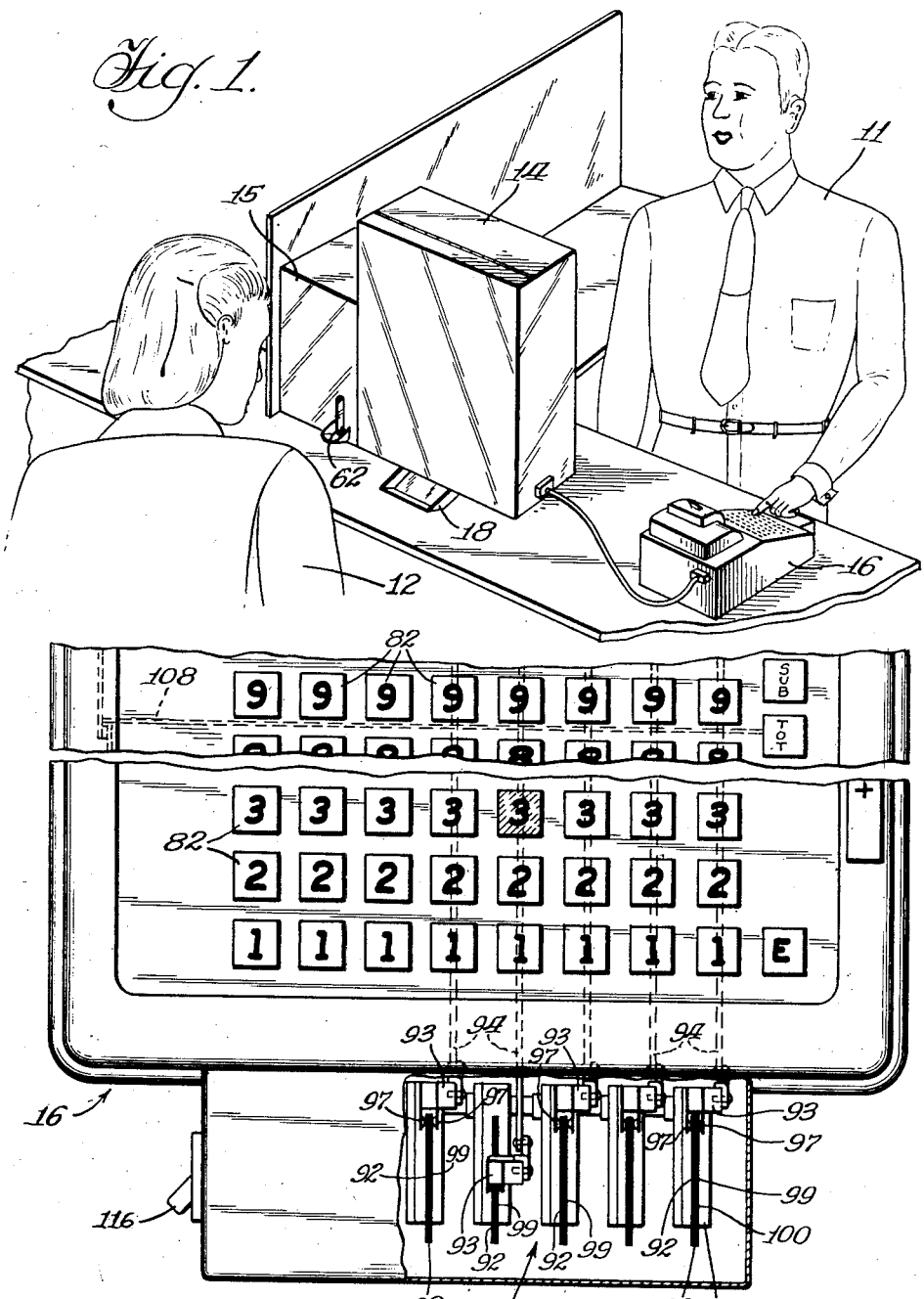
Fig. 1 is a perspective view of the physical arrangement of the currency dispensing system, and showing its use.
Fig. 15 is a plan view, partly in section, of the keyboard of the adding machine shown in Fig. 12, and further illustrates the construction of the electric switch mechanism, as well as the manner in which it is mounted on the machine.

Referring now to Fig. 1 of the drawings, one embodiment of the currency dispensing system comprising the invention, is shown. The person 11 may constitute a teller in a bank, a cashier in a restaurant, or the like who desires to pay a certain amount of money to a customer 12. To accomplish this in a minimum amount of time, this amount is provided by means of the invention which includes a paper currency dispensing apparatus, shown generally at 14, a coin currency dispensing apparatus, shown at 15, and a control device 16 for providing an indication of the desired amount of currency.

The paper currency dispensing apparatus 14, comprises broadly a means for containing and distributing a plurality of compact packages of paper currency arranged in groups of different denominations, and movable gate means cooperating with the containing means for dispensing the desired amount of paper currency. The coin currency dispensing apparatus includes a means for containing means to dispense a desired amount of coin currency. In the embodiment of the invention herein disclosed, both the paper currency dispensing apparatus, and the coin currency apparatus are electrically operated. It is to be understood, however, that this is but the preferred construction, and that both the paper and the coin currency dispensing apparatus could be easily modified for use with mechanically operated control devices.

The control device 16 for providing an indication of a desired amount of currency includes a standard adding machine of any well known type which is capable of providing mechanical movement proportional to a desired amount, modified by the addition of means for converting the mechanical movement to an electric signal indicative of the desired amount. In a species of the disclosed embodiment of the invention, a further refinement for allowing the adding machine to combine the amounts tabulated, but to prevent payment of the combined amount, is provided. In a second species of the disclosed embodiment, a different refinement is included for allowing the machine to pay only the combined amounts.

Paper currency dispensing apparatus

Referring now to Fig. 2 of the drawings, the paper currency dispensing apparatus is shown in greater detail, and includes a housing 17 having a tray 18 secured to its underportion. Mounted on housing 17 are a plurality of receptacles, each of which comprises an elongated magazine 19, removably seated in a magazine receiving chamber 21. The lower end of each of the magazine receiving chambers 21, and thus of the receptacle of which it comprises a part, is closed by a movable gate, not shown, that is mechanically connected to and driven by a means for moving the gate. As is best shown in Fig. 3, each of the gate moving means comprises an electric solenoid 22 mounted on the back part of housing 17, and arranged in the manner shown. As a safety feature, the paper currency dispensing apparatus includes a lockout switch means 23 secured to the side of each of the magazine receiving chambers 21, and included in the electrical circuit for energizing the solenoids 22. Magazines 19 are adapted to receive a plurality of compact packages of paper currency arranged in groups of different denominations, and by operation of the movable gate means, dispenses any desired package or combination of packages to provide the desired amount of paper currency. By reason of this construction, magazines 19 are removable from housing 17; thereby facilitating operation of the machine by simplifying the loading of the currency receiving receptacles.

Referring now to Fig. 4, the magazine receiving chamber 21 comprises an integral member constructed of brass, or the like, and secured to housing 17 by means of a pair of ears 26, and set screws 27. The chamber 21 includes a substantially flat, rectangular body portion having its central portion open, and a pair of leg portions 28 integral with the ends thereof. Rotatably mounted in the ends of the leg portions 28 of each of the chambers 21, is a movable gate means 29 comprising a partially cutaway cylindrical sleeve forming a cradle. The gate means or cradle 29 is mechanically coupled through a coupling joint 31 and drive shaft 32 to its respective driving solenoid 22, and is normally maintained in the position shown in Fig. 6, by a return spring 33, best seen in Fig. 3. In the position shown in Fig. 4, cradle 29 is inaccessible from the interior of chamber 21, and serves to close chamber 21. Upon solenoid 22 being actuated, cradle 29 is rotated to a position providing access thereto from the interior of chamber 21, and acts as a means for selectively emptying the contents of the chamber 21, one by one. This particular construction of the gate or cradle 29, renders the dispensing machine described herein particularly well adapted for dispensing compact, cylindrically shaped objects; and, though designed for the purpose of dispensing compact packages of paper currency, it could be readily adapted for use in dispensing other objects. And, while gates 29 are operated by solenoids 22, it is to be noted that each of the cradles or gates 29 could be easily mechanically interlinked with a control device for selectively opening any desired number thereof.

Each of the magazines 19 comprises an elongated sheet metal member forming a flat, rectangular shaped parallelepiped with the ends thereof open, and, as is best shown in Fig. 2, having longitudinal slots 34 running the full length of each of its small dimension sides. Each of the magazines 19 has a notch 35, seen in Fig. 6, cut in the lower end of the small dimension sides thereof, which, upon the magazine being seated in its respective receiving chamber 21, coacts with a crossbar 36 connected between leg portions 28 to firmly retain each of the magazines properly seated. This means of securing the magazines within their respective chambers, allows each of the magazines to be easily removed for refilling with compact packages of paper currency. Magazines 19 are adapted to receive a plurality of compact packages of paper currency, the packages of currency contained within any one of the magazines 19, being of a predetermined amount and of a different denomination than the packages in the remainder of the magazines. Thus, upon movable gate means 29 being selectively operated, a predetermined sum of paper currency is dispensed.

As is best shown in Fig. 5, the compact packages of paper currency preferably comprise small cylindrical paper, plastic, cardboard, etc., containers 38 having many different colors; the containers used in any one of the magazines 19 being of a different color than the containers used in the remainder of the magazines. By this feature, the possibility of errors is reduced when filling the containers with paper currency, when loading each magazine with currency of a predetermined denomination, and when seating a loaded magazine in its proper receiving chamber. The paper currency in the packages is rolled into compact cylindrical form, and placed in a cylindrical container bearing a color corresponding to the denomination of the currency. This may be accomplished by hand, if desired, but is preferably performed by machine; thereby effecting a further saving in time. If desired, packaging of the paper currency could be accomplished in a manner other than fitting the same within compact, cylindrical containers such as wrapping the desired paper currency around the outside of a cylindrical core.

Upon a loaded magazine being firmly seated in its receiving chamber 21, one of the packages or containers of paper currency 38 drops down into contact with the gate or shell of cradle 29, with the remainder of the containers stack on top of it, in the manner shown in Fig. 6. As previously disclosed, biasing spring 33 coupled to each of the solenoids maintains the cradle inaccessible from the chamber 21, so that the containers are prevented from dropping out of chambers 21. Each of the solenoids 22 is of the well known rotatable armature type, and upon being energized, rotates cradle 29 to the position shown in dotted lines in Fig. 6; thereby making the cradle accessible from the interior of chamber 21, and allowing the lowermost of the compact packages of paper currency to drop into the cradle. As the energization of solenoid 22 is instantaneous, biasing spring 33 causes cradle 29 to rotate back to its normal position, and to dump the container or package of currency into receiving tray 18. While this particular construction of the movable gate means 29 and solenoid 22, has been described, it is to be understood that other mechanical devices could be equally well utilized for dispensing the compact packages of paper currency contained within the receptacles comprising magazines 19 and magazine receiving chambers 21.

As a safety feature to prevent the actuation of the dispensing machine should any one of the receptacles become empty, lockout switch means 23 is provided on each of the receptacles. The lockout switch means includes a rectangular plastic member 39 having a pair of apertures 41 on either end thereof, and secured to the leg portions 28 of magazine receiving chamber 21. Mounted on insulating member 39 is a first switch biased toward a closed position comprising a T-shaped resilient member 42 of conductive material, having a wedge-shaped insulating member 43 secured to its end. The ends of the cross arm of T-shaped member 42 are adapted to cooperate with a pair of conductive plates 44 and 45 which are mounted on insulating plate 39 on either side of member 42, and are electrically connected in a portion of an electric circuit including a source of electricity. The switch thus constituted, comprises a first lockout switch that is maintained open by the coaction of wedge-shaped member 43 and the lower end of the respective magazine 19 with which it is adapted to cooperate. Should the magazine in question be removed for refilling, the ends of the cross arm of T-shaped conductive member 42 are allowed to close against conductive plates 44 and 45; thereby closing the above mentioned circuit.

Included in a circuit common to all of the above described conductive plates 44 and 45, and their respective circuit portions, is the field winding of an electrically operated switch 46, best seen in Fig. 3, that is physically mounted on housing 17, and that has its normally closed switch contacts included in the electrical circuit energizing the solenoids 22. Thus, upon any one of the magazines 19 being removed from its' respective receiving chamber 21, the switch formed by member 42 and plates 44 and 45 is allowed to close; thereby energizing the field winding of electrically operated switch 46. This results in opening the normally closed contacts of switch 46, and deenergizing solenoids 22.

Each of the conductive plates 43 and 44 also include resilient leg portions 47 and 48, respectively, which are positioned in the apertures 41 formed in insulating plate 39, and are bent inwardly towards the interior of chambers 21, in the manner shown in Fig. 6 of the drawings. Upon one of the magazines becoming empty, a follower 49 having a conductive portion, and carried in each magazine for forcing the paper currency containers downward, comes into contact with the leg portions of conductive plates 47 and 48. Referring now to Fig. 7, the follower 49 comprises a shaft 51 upon which a pair of heavy, conductive, members 52 electrically joined together by a conductive strip 53, are mounted. The follower 49 is positioned in its respective magazine 19, with the ends of the shaft 51 riding in slots 34 in the sides of the magazine, and is maintained properly positioned in the magazine by a pair of insulated guiding ears 54 secured to shaft 51. As is best shown in Fig. 6, upon one of the magazines 19 becoming empty, its respective follower 49 is guided into contact with the leg portions 47 and 48 of conductive plates 44 and 45 respectively, by the configuration of slots 34. As previously described, each set of conductive plates 47 and 48 is connected in common to the field winding of electrically operated switch 46. Thus, upon one of the conductive followers 49 engaging leg portions 47 and 48 of the conductive plates, the field winding of switch 46 is energized. This opens the electrical circuit portion to the solenoids 22, and prevents subsequent operation of the mechanism.

From the above disclosure, it can be appreciated that the invention provides a compact and reliable apparatus for dispensing paper currency. Because of the simplicity of its construction, the apparatus can be cheaply manufactured, and is easily adapted for use with existing adding machines or the like. The provision of removable magazines facilitates operation of the apparatus, in that empty magazines can be quickly removed, and replaced with loaded ones; and loading of the magazines can be accomplished separately, and prior to business hours, if desired. By providing differently colored containers for each denomination of currency, the possibility of mistakes in filling the containers, loading the magazines, or in placing the magazines in their proper positions on the apparatus, is reduced. Paying of improper sums of currency due to the fact that one or more of the magazines is empty, is prevented by the safety lockout switch means. And, in addition to the currency dispensing advantages, the apparatus provides a novel, rotatable dispensing mechanism that is particularly suited for dispensing compact cylindrical objects.

*Coin dispensing apparatus*

Referring now to Fig. 8, the coin dispensing apparatus comprises a housing 61 having a tray 62 secured to its underportion. Mounted on housing 61, are a plurality of coin receiving receptacles or chutes 63 designed to receive coins of different denominations, and having different physical dimensions. As is best shown in Fig. 8, the first coin receptacle or chute 63 on the left, is designed to seat a fifty cent piece, the next four chutes are designed for a ten cent piece, the sixth, a five cent piece, and the last four, a one cent piece. Each of the coin receiving chutes 63 has a movable ejecting means comprising a pusher arm 64 connected by a crank arm 65 to a driving solenoid 67 for dispensing the coins contained within the chutes. The solenoids for all of the coin receiving chutes are arranged on housing 61 in the manner best shown in Fig. 9, and are electrically connected to the control device 16 which controls the amount of coins dispensed by the apparatus.

Referring now to Fig. 10, the coin receiving chutes 63 are supported in an integral mounting base 68 of cast metal that is secured to housing 61 by means of set screws 69, and, as is best seen in Fig. 9, has a plurality of seats formed therein, each one of which is adapted to receive a particular one of the chutes 63. The seats for each of the receiving chutes 63 terminates in a chamber that is defined by the slot formed in mounting base 68 to accommodate the respective pusher arm 64 of the chute in question, and that has an opening therefrom providing access to tray 62. As is best shown in Fig. 10, the lowermost coin 71 drops into the chamber provided by said slot, and is engageable in that position by the pusher arm 64, upon the same being operated, for ejecting the desired coin into tray 62. Pusher arms 64 are connected by a pin 72 riding in an aperture 73 formed in the bottom of mounting base 68, to their respective connecting arms 74 that are in turn connected to the crank arms 65. Crank arms 65 are keyed to the drive shaft of their respective driving solenoids 67, and maintain the pusher arms 64 in the retracted position by reason of a biasing spring, not shown, contained in each of the solenoids. Solenoids 67 are arranged in the manner shown in Fig. 8, on a platform 76 secured to housing 61 by means of set screws 77, and comprise rotary armature solenoids of the same type used on the paper currency dispensing apparatus. Upon being selectively energized, the solenoids operate to dispense any desired amount of coin currency ranging between $.01 to $.99. While safety lockout switch means have not been provided on the coin dispensing apparatus, it is to be understood that such could be included if this is deemed desirable.

For the purpose of providing desired combinations of coins, interlocking switch means are provided on certain of the coin receiving chutes. In particular, interlocking switches are provided on the last three of the four ten cent chutes, and the last three of the four one cent chutes which, as is best shown in Fig. 11, comprise an extension 78 of the drive shaft of each of the respective solenoids 67 concerned. Mounted on the underportion of platform 76 adjacent such solenoids, is an insulating block 79 having a pair of conductive switch arms 80 secured thereto on both of its sides, in the manner best seen in Fig. 10, which are electrically connected in the electric circuit energizing the preceding one cent, or ten cent solenoid. Secured to shaft extension 78, and cooperating with each of the switch arms 80, is a double ended cam 80a which normally maintains the switch arms 80 separated. By means of this construction upon one of the solenoids 67 in question, being actuated, the solenoid drive shaft 78 rotates double ended cam 80a to a position allowing the contacts 80 to close. This operation results in energizing the preceding solenoid, which in turn may also have an interlocking switch secured thereto. In this event, the operation is again repeated, and the desired combination of coins is provided. For example, to provide four cents, the last one cent solenoid 67 on the right of the coin dispensing apparatus, best shown in Fig. 8, is actuated. This results in providing one cent out of the chute in question, and simultaneously actuates the preceding solenoid through the interlocking switch means contained thereon, in the above described manner. The operation is then repeated to actuate the next two preceding solenoids to provide the desired four cents.

While this particular type of coin dispensing apparatus has been disclosed for use with the invention, it is to be understood that other known coin dispensing mechanism could be easily incorporated in its place. Further, the apparatus is not to be restricted to use with a currency dispensing system, for its compact construction, and adaptability for use with standard adding machines, makes it a particularly desirable means for dispensing coin currency.

Control device

Referring next to Fig. 12, a control device for developing an indication of the selected quantity, is shown. Generally, the device comprises a standard adding machine modified to include a means for converting the mechanical movement of the adding machine to electric signals representing the selected quantity. The adding machine includes a housing 81 having a plurality of operable keys 82 arranged in groups or series (as is best shown in Fig. 15), ranging from one cent, two cents, and up to nine cents in one group or series; ten cents to ninety cents in a second group or series; one dollar to nine dollars in a third group or series; ten dollars, twenty dollars and up to ninety dollars in a fourth group or series; and so on up to a group or series ending in an amount of $900,000 is reached. Each of the operable keys 82 is adapted to be depressed, and upon being depressed, engages mechanically movable means including a plurality of movable members 83. There is one movable member 83 for each of the groups or series of keys, and each is biased to the position shown in Fig. 12 by a strong mechanical spring, not shown. Each of the members 83 is operatively connected through a crank arm 84, operating linkages not shown, and a drive shaft 85 to an electric motor 86. The mechanism heretofore described is found in equivalent form in practically all known adding machines, that are motor driven; therefore, further descritpion of the details of its construction, is believed to be unnecessary.

In operation, when one of the keys 82 is depressed, and the control switch controlling the operation of motor 86 indicated by the plus bar in Fig. 15, is operated, motor 86 causes crank arm 84 to rotate clockwise, driving member 83 towards the forward end of housing 81. Member 83 has a plurality of key engaging means 87 formed along its upper edge, which are adapted to engage only a desired one of the said keys when it is in the depressed condition shown in dotted lines in Fig. 12. Upon the engaging means 87 coming into contact with a depressed key 82, further forward movement of member 83 is prevented. This serves to limit the forward movement of any one of the members 83 in a manner peculiar to a predetermined quantity lying within the series of numbers which its respective keys 82 represent. In this fashion, the amount listed by the depressed keys 82, is tabulated within the machine. Considering all of the members 83, their total movement is indicative of any desired quantity lying within the range from .01 dollars to $999,999.99.

The machine 81 also includes a printing mechanism, not shown, which includes a plurality of printing bars mechanically connected through proper gearing, linkages and the like to motor 86. The printing bars are moved a distance corresponding to the selected amount, simultaneously with movable members 83, and print a record on a strip of paper 88 of the amounts tabulated on the machine. By this mechanism it is possible to record the amount being paid out with the currency dispensing system at the same time that the payment is being made. This results in a very substantial saving of time on the part of the person dispensing the currency.

Adding machine 81 also includes summation means for totaling the quantities tabulated by the machine. In order to utilize the summation means, a quantity is tabulated in the above described manner by depressing the plus bar. This operation is repeated until all of the quantities to be added are tabulated. Then, by depressing the totalizing bar or key, best seen in Fig. 15, actuating means is rendered operable to total the amounts tabulated on the machine. Should it be desired to determine the difference between two sums, or two quantities, the machine also includes subtracting means which is operated in the following manner. The first quantity is tabulated on the machine in the above described manner. The quantity to be subtracted is then listed on the machine by pressing the proper keys 82, and in place of tabulating the amount listed by operating the plus bar, the subtracting key, also shown in Fig. 15, is depressed. To get the difference, the actuating means is operated by depressing the totalizing bar, to operate a subtracting means contained within the adding machine, and the difference appears on paper 88. Both the summation means and the subtraction means, hereinafter called the combining means, are mechanically interconnected with movable members 83; so that upon the combining means being actuated, members 83 are moved a distance corresponding to the combined amount. Likewise, the printing bars of the printing mechanism are moved.

While a particular adding machine structure has been described, it is to be understood that the invention is in no way to be limited to use only with this particular adding machine structure. Other adding machines wherein mechanical means are included which are movable a distance corresponding to and indicative of a selected quantity, could be easily adapted for use with the invention. Further, should it be desired to utilize an adding machine having only a summation means, or alternatively, a subtraction means, this could be easily done.

In accordance with the present invention, the above described adding machine is modified by the addition of switch mechanism 91, best shown in Fig. 12, including a plurality of switch structures, one each for each of the movable members 83. The switch structures include a plurality of stationary electric switch contacts 92, and movable switch means comprising an armature 93. Each of the switch armatures is mechanically connected to a respective one of the movable members 83 by a connecting link 94. As is best shown in Fig. 13, the stationary contacts 92 are mounted within an arcuate insulating body 96, and are electrically insulated one from the other. Armature 93 comprises a pivoted crank arm having a pair of wiper contacts 97 fixed to its outer end, and physically arranged to selectively engage any one of the stationary contacts 92, upon the movable member 83 being driven forwardly by electric motor 86. Stationary contacts 92 consist of nine radially extending, electrically isolated conductive bars circumferentially arranged on arcuate insulating member 96, and are separated by an insulating sheet 98, also illustrated in Fig. 15, from a second set of stationary contacts 99 and 100. Contacts 99 are circumferentially arranged on arcuate insulating member 96 in the manner best seen in Fig. 13, and consist of four electrically insulated conductive bars similar to, and physically aligned with the first four conductive bars of stationary contacts 92; and contact 100 a fifth conductive plate equal in length, and physically aligned with the last five of stationary contacts 92. Wiper contacts 97 are disposed on either side of the stationary switch terminals thus constructed in the manner best seen in Fig. 15, and serve to selectively connect desired combinations of contacts 92, 99 and 100 in an electrical circuit, to be described more fully hereinafter. While the switch mechanism described above is connected to the movable members 83, it is thought to be obvious that it could be equally well secured to the printing bars of the printing mechanism, or to any other part which is movable a distance corresponding to a selected quantity.

The above mentioned electrical circuit also includes a pair of timing switch contacts 101 which are adapted to be closed by a cam follower 102. Cam follower 102 rides on a timing cam 103 keyed to drive shaft 85, and shaped in such a manner that the contacts 101 are closed a predetermined time after energization of the motor 86. This time is actually equal to the period of time required for movable members 83 to move a distance corresponding to the integers 9, 90, etc., and is the greatest amount of time that can be required for any one of the members 83 to move its ultimate position, in a single operation.

Upon any series of numbers, for example 3339 representing a sum of $33.39, being selected on the keyboard shown in Fig. 15; the control device operates as follows. The number is listed on the keyboard, and the control switch controlling the operation of motor 86, is closed by depressing the plus key shown in Fig. 15. This results in actuating motor 86 causing the member 83 associated with the ten to ninety dollars series to be driven, through drive shaft 85 and the interconnecting linkages, towards the forward end of the machine. Upon reaching a predetermined distance corresponding to the value of thirty dollars, one of the engaging means 87 on the member in question, is engaged by the depressed three key, and prevents further forward travel of the member. This results in positioning the wiper contacts to engage predetermined ones of stationary terminals 92, 99 and 100, in the manner shown in Fig. 15. Each of the members 83 associated with the one to nine dollars series of keys, and the ten to nine cents series of keys, moves in exactly the same fashion as the ten to ninety dollar member. However, the one to nine cent member 83, is allowed to travel the predetermined distance corresponding to the quantity numeral nine, and is the greatest distance that any of the members 83 is allowed to travel. Due to the fact that each of the members 83 travel at the same speed, the time required for the one to nine cent member 83 to assume its ultimate position, is greater than the time required for the ten to ninety dollar, the one to nine dollar, and the ten to ninety cent members to assume their ultimate positions. Therefore upon the control switch of motor 86 being closed, with the keyboard set as described above, the ten to ninety dollar member 83 moves its wiper contact 97 a distance corresponding to thirty dollars, and stops. The one to nine dollar member, and the ten to ninety cent members also move their respective wiper contacts an equal distance, and stop. The one to nine cent member 83 must move its wiper a distance corresponding to the numeral nine, however, and therefore requires a greater amount of time to reach its ultimate position. The cam operated timing switch 101 allows the one to nine cent member 83 sufficient time to reach this position before being closed. It is this feature that prevents energization of the electrical circuit in which the stationary terminals 92 and 99 are connected by wiper contacts 97, from being energized as the wiper contacts 97 are travelling over the stationary terminals. It should be noted, that after each energization of the motor 86, the drive shaft timing cam 103 assumes a neutral position from which it commences its travel upon the next succeeding operation of the mechanism. As this feature is inherent in standard adding machine structures, a detailed description of such mechanism is unnecessary, and would unduly complicate the present disclosure.

In order to prevent the energization of the above mentioned electrical circuit when the combining means of the adding machine is utilized, an electric switch comprising movable contact 106 and stationary contact 107, is included in the above mentioned circuit. Movable contact 106 is mechanically connected through a mechanism indicated by dotted lines 108 in Fig. 15, to the totalizing key used to actuate the said combining means, and is movable upon the totalizing key being depressed. A similar mechanism to which such a switch may be connected is found on standard adding machines which may have a different construction than that shown. In one species of the embodiment of the invention, switch 106, 107 comprises a normally closed switch included in the above mentioned electrical circuit. Upon the summation or subtraction mechanism of the machine being actuated in the manner described in a preceding paragraph, movable switch contact 106 is opened by mechanical interconnection 108, and the above mentioned electrical circuit is prevented from being energized. Should it be desired to dispense only the sum or difference of the quantities tabulated on the machine, the switch 106, 107 could be made a normally open switch. By this modificaton, the electrical circuit including switch means 93 and timing switch 101 would be energized only upon the combining means of the machine being actuated.

From the preceding description it can be appreciated that the invention provides a novel switching means including switch mechanism 93 and timing switch 101, for converting the mechanical movement inherent of an adding machine, to an electric signal representative of a selected quantity.

*Overall system*

Figure 16:
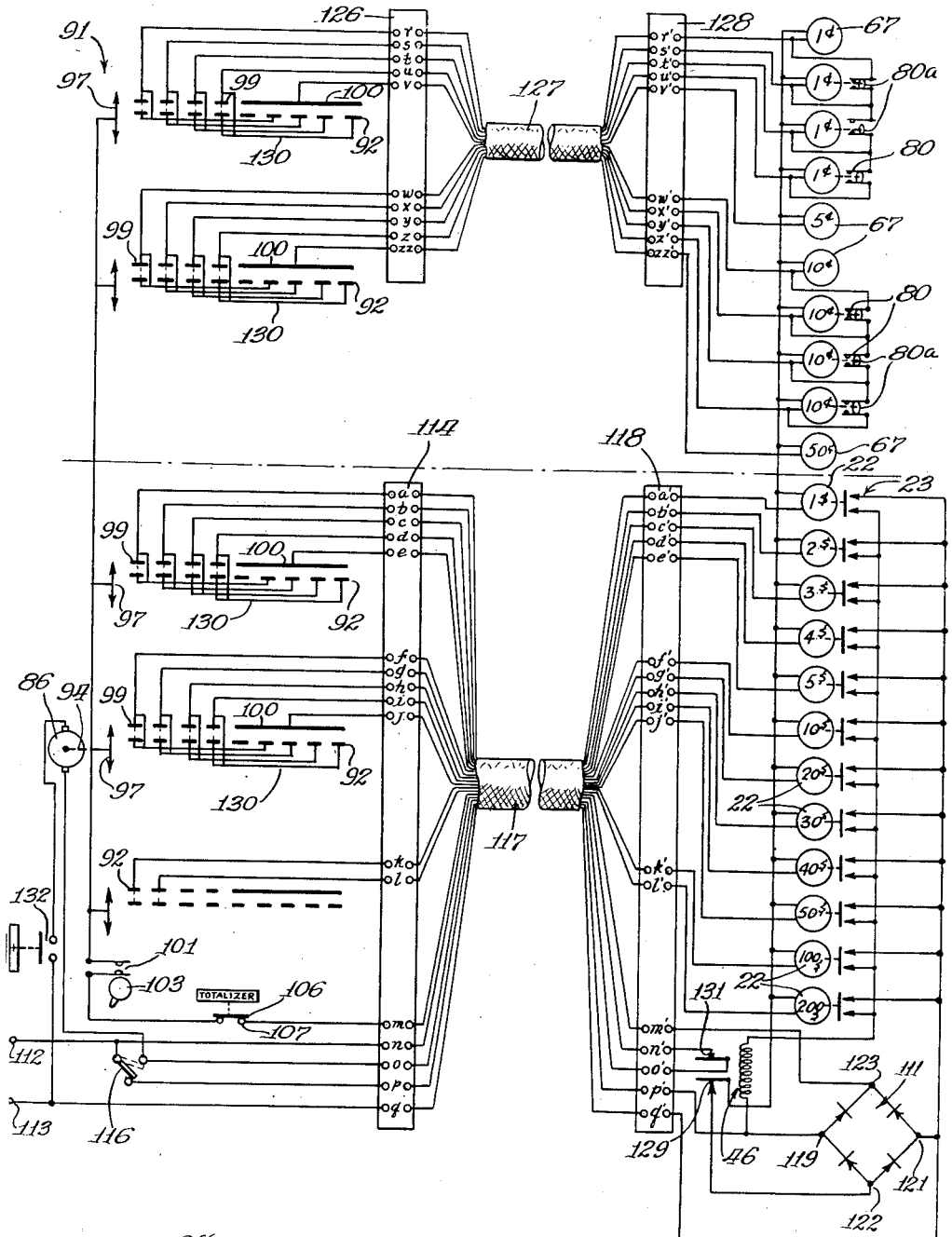
Fig. 16 is a schematic wiring diagram of the entire currency dispensing system.

Referring now to Fig. 16, the wiring diagram of the overall currency dispensing system, is shown. On the right hand side of the drawing, each of the solenoids 67 and 22 is depicted by a circle enclosing numerals representing the amount of currency that is delivered when each solenoid is energized, from its respective chute or receptacle. Due to the fact that solenoids 22 and 67 are of the direct current type, a rectifier bridge indicated at 111 is included in the circuit. Because most of the known adding machines operate on alternating current, it is necessary to include the rectifier bridge; however, should it be desired, and direct current is available, the system could be wired for operation with direct current power, and the rectifier 111 could then be omitted.

Alternating current energy is obtained from supply terminals 112 and 113 which are directly connected to terminals $n$ and $q$ of a terminal strip 114. Supply terminal 112 is also connected across a selective line switch 116 to terminal $p$ of terminal strip 114. Line switch 116 is mounted on the housing 81 of the adding machine, as is best shown in Fig. 12, and is included for the purpose of allowing the adding machine to be operated separately from the currency dispensing mechanism. From terminal strip 114, terminals $p$ and $q$ are directly connected through a multi-conductor cable indicated at 117, to terminals $p'$ and $q'$ respectively, of a second terminal strip 118. Terminals $p'$ and $q'$ are connected directly to diagonal points 119 and 121 of rectifier bridge 111. The direct current energy derived in rectifier bridge 111 is obtained from diagonal points 122 and 123 thereof, with point 122 being connected through one of the normally closed contacts 129 of solenoid operated switch 46 to one side of each of the field windings of all of solenoids 22 and 67, and point 123 being connected to terminal $m'$ of terminal strip 118. Terminal $m'$ is connected through multi-conductor cable 117, terminal $m$ of terminal strip 114, through the normally closed totalizer selector switch 106, 107, and through cam operated timing switch 101, to the wiper contacts 97 of each of the switching mechanisms 91. As previously described, each of the wiper contacts 97 may be selectively positioned to bridge any of the stationary contacts 92, 99 and 100, in accordance with the amount selected. Contacts 92, 99 and 100 are connected through terminals $a$ to $l$ of terminal strip 114, and terminals $r$ to $zz$ of a terminal strip 126, back through multi-conductor cables 117 and 127 to terminals $a'$ to $l'$ of terminal strip 118, and terminals $r'$ through $zz'$ of a terminal strip 128. Terminals $a'$ to $l'$ are connected in parallel through the field windings of each of solenoids 22 respectively, and in common through the normally closed contacts 129 of solenoid operated switch 46 to the diagonal point 122; and, terminals $r$ to $zz'$ are connected in parallel through the field windings of each of the solenoids 67 respectively, and in common through contact 129 to diagonal point 122. With regard to the last three one cent solenoids 67, and the last three ten cent solenoids 67 of the coin dispensing apparatus, terminals $s'$, $t'$, and $u'$ respectively, are also connected across the normally open contacts of interlocking switches 80 to the next preceding one cent solenoid, and terminals $x'$, $y'$ and $z'$ are respectively connected to the next preceding ten cent solenoid. In order to provide proper combinations of packages or containers of paper currency by means of the denominating principle embodied in the currency dispensing system, jumpers or bridging conductors 130 are provided which connect together the number 1 and number 6, number 2 and number 7, number 3 and number 8, and number 4 and number 9 contacts respectively of each set of stationary contacts 92 of the switch mechanism. The purpose of conductors 130 will be better understood from a reading of the succeeding paragraphs.

As a safety feature, supply terminals 112, and 113 are connected directly from terminals $p'$ and $q'$ respectively, across the normally open contacts of lockout switch means 23, through the field winding of solenoid operated switch 46. And, supply terminal 112 is connected through terminals $n$ and $n'$ of terminal strips 114 and 118 respectively, through a second normally closed set of contacts 131 of electrically operated switch 46, back through terminals $m$ and $m'$ and connected directly across motor 86 through the normally open motor control switch 132 that is operated by the plus key shown in Fig. 15.

In operation, the sum to be tabulated is listed on the keyboard shown in Fig. 15, and the plus bar for actuating the adding machine mechanism, shown on the right hand side of the keyboard, is depressed. As is best shown in Fig. 16, actuation of the plus bar closes the circuit through motor 86, and causes the motor to drive movable member 83, shown in Fig. 15, a distance determined by whichever keys have been selectively depressed. Movement of the members 83 is transmitted through linkages 94 indicated by the dotted line to whichever of the wiper contacts 97 are connected to the members selectively moved. Movement of the wiper contacts 97 places the contacts in a position to bridge or close the circuit through whichever of the stationary contacts 92, 99 or 100 correspond to the amount selected. For example, should it be desired to dispense nine dollars, the one to nine dollar series wiper 97, is moved to its outermost position; thereby closing the circuit through stationary contact 100, and the last of the stationary contacts 92. Simultaneously, with movement of wiper contacts 97, the timing cam on drive shaft 85 is turned, and, as previously described, allows the timing switch contacts 101 to close after a sufficient period of time for the wipers 97 to reach their outermost position. Upon timing switch contacts 101 being closed, D. C. energy is applied through the closed electrical circuit including stationary contact 100, and the solenoid for dispensing a five dollar package is actuated; thereby dispensing five dollars in paper currency. Closing of timing switch contacts 101 also closes the circuit including the last of the stationary contacts 92, and D. C. energy from rectifier 111 is connected through one of the bridging conductors 130 back to the stationary terminal 92 corresponding to an amount of four dollars. This results in actuating the solenoid for dispensing four dollars in paper currency, and, as the operation of the four dollar and five dollar solenoids is simultaneous, the desired nine dollars in currency is provided. With regard to the amounts from ten dollars to ninety dollars and one hundred dollars to two hundred dollars, the operation of the apparatus is identical to that described in relation to the amounts from one to nine dollars. With the exception of the operation of interlocking switches 81, amounts from one cent to nine cents and from ten cents to ninety cents, are provided in much the same manner. While the system disclosed in Fig. 15 is capable of delivering only amounts ranging between one cent to $299.99, it is apparent, that the system can be adapted to dispense amounts of currency ranging up to any desired limits.

Should the receptacles corresponding to any of the paper currency dispensing solenoids 22 become empty, either by reason of the magazine 19 thereof being removed, or the supply of compact packages of paper currency being depleted, the lockout switch means 23 thereof is closed, in the manner previously described. Closing of lockout switch means 23 connects the field winding of electrically operated switch 46 directly across supply terminals 112 and 113, and results in the simultaneous opening of each of the normally closed contacts 129 and 131 thereof. This action opens one side of the supply circuit to all of the solenoids 22 and 67, and in addition, opens the circuit of motor 86; thereby preventing subsequent operation of the dispensing system.

Upon summation means, or the subtraction means of the adding machine 81 being operated by depressing the totalizer bar, the normally closed contacts of switch 106, 107 are opened; thereby breaking the circuit supplying wiper contacts 97, and preventing the payment of either the sum or the difference of the amount tabulated on the machine. Should it be desired to pay out only the sums or the difference of amounts tabulated on the machine, switch 106, 107 can be made a normally open switch. In such case, payment will not be made when the individual numbers are set in the machine, and only the desired sum or difference will be provided upon the totalizing bar being depressed.

From the foregoing description, it can be readily appreciated that the invention provides a novel system for dispensing desired amounts of currency in both paper and coin form, and for simultaneously recording the amounts dispensed. In accordance with the invention money is prepackaged in compact packages, and the packages are vended to the customer through a machine activated by a standard adding machine having a few simple modifications. The system is reliable in its operation, and because it incorporates a standard mechanism as a control device, it can be relatively easily and cheaply manufactured. Dispensing of currency, and in particular paper currency, is greatly facilitated in that the currency can be prepackaged by machine prior to business hours, and loaded in magazines adapted to be removably seated in the dispensing apparatus. Because of its compact construction, the dispensing system can be situated in a standard tellers cage, or the like, accessible to customers. To pay out a given amount, it is necessary only to list the amount on the adding machine, and simultaneously with the printing of a record of the amount, the currency involved is vended to the customer. The speed with which the system can be used is limited only by the time required for the customer to pick up his coin and packaged currency. As the dispensing apparatus always vends the amount printed by the adding machine, should the wrong amount be paid a customer by depressing the wrong keys, the record will show to whom the wrong amount was paid. If a magazine containing prepackaged currency becomes empty, the entire system including the adding machine becomes inoperative; thus, preventing the payment of an improper sum with its consequent irritation of a customer. The empty magazine can then be removed, and replaced with a full one. Should one of the magazines not be replaced, the entire system is rendered inoperative. These provisions simplify servicing of the apparatus. By the reason of the totalizing selector switch, the combining means of the adding machine can be used when desired without having to disconnect the dispensing machine. By a simple alteration, the system can be modified to pay out only when the combining means is actuated.

Obviously, other modifications and variations of the present invention are possible in the light of the above teachings. It is therefore to be understood that changes may be made therein which are within the full intended scope of the invention as defined in the appended claims.

I claim:

1. A control device for deriving electric signals representing selected quantities including in combination, mechanically movable means adapted to be moved in a manner corresponding to a selected quantity, electric motor means operatively connected to said mechanically movable means for driving the same, an electrical circuit including potential supply means, said circuit including a portion connecting said potential supply means to said electric motor means for energizing the same, electric switch means mechanically connected to said mechanically movable means and included in said electrical circuit for converting said mechanical movement to an electric signal, actuating means cooperating with said mechanically movable means for totaling the amounts indicated by said movable means and for moving said mechanically movable means in a manner indicative of the total, and a selecting switch operatively connected to said last mentioned means and included in said electrical circuit for deenergizing said electric circuit upon said last mentioned means being actuated.

2. A signal developing device for driving electric signals representing selected quantities including in combination, mechanically movable means adapted to be moved in a manner corresponding to a selected quantity, electric motor means operatively connected to said mechanically movable means for driving the same, an electrical circuit including potential supply means, said circuit including a portion connecting said potential supply means to said electric motor means for energizing the same, electric switch means mechanically connected to said mechanically movable means and included in said electrical circuit for converting said mechanical movement to an electric signal, actuating means cooperating with said mechanically movable means for subtracting one selected quantity from a preceding selected quantity and for moving said movable means in a manner indicative of the difference, said actuating means including an operating member for initiating operation thereof, and a selecting switch operatively connected to said operating member and included in said electrical circuit for controlling the energization of said switch means in accordance with the position of said operating member.

3. A signal developing device for deriving an electrical signal representing a selected quantity for use with a machine having a plurality of operable keys representing particular quantities, mechanically movable members having portions thereof engageable by said keys and limited in movement thereby in a manner corresponding to the keys selected, electric motor means operatively connected to and driving said mechanically movable means, and means cooperating with said mechanically movable means for combining the quantities selected on successive operations and for moving said movable members in a manner corresponding to said combined amounts including actuating means for controlling said combining operation; said device including in combination, an electrical circuit having electric switch means for converting the movement of said mechanically movable means to an electric signal, said switch means including a plurality of stationary contacts and movable contact means mechanically connected to said mechanically movable means for selectively engaging said stationary contacts, each of said stationary contacts being arranged to represent a particular quantity and being electrically connected in said electrical circuit through said contact means, a cam operated timing switch operatively connected to said motor means and electrically connected in said circuit for controlling the energization thereof, and a selecting switch operatively connected to said actuating means and included in said electrical circuit for controlling the energization thereof in accordance with the position of said actuating means.

4. A currency dispensing system including in combination, control means including a plurality of operable keys representing different quantities, mechanically movable members having portions thereof selectively engageable by said keys and being limited thereby to particular movements corresponding to selected quantities, electric motor means operatively connected to said mechanically movable members for driving the same, an electrical circuit including potential supply means for energizing said electric motor means, said electrical circuit including switch units individually associated with said mechanical members and having a plurality of stationary contacts and movable contact means mechanically connected to said mechanically movable members for selectively engaging said stationary contacts in accordance with the movement of said members, timing switch means electrically connected in said circuit for controlling the energization of said electric switch units, means coupling said timing switch means to said motor means for operation of said timing switch means at a predetermined time in the driving cycle thereof, means cooperating with said mechanically movable members for combining the quantities corresponding to successive movements of said keys and causing operation of said motor means for moving said movable members in a manner corresponding to the combined quantities, said last-named means including an operating member for initiating operation thereof, and additional switch means actuated by said operating member and electrically connected in said circuit from said electric switch units, said additional switch means controlling the energization of said circuit depending upon the position of said operating member.

5. A currency dispensing system including in combination, a calculating machine having a keyboard on which amounts to be dispensed may be set up, and means operable to enter the amount in said machine including a plurality of slideable index bars each having a movement corresponding to one digit of the amount set up, and electrical circuit means including a plurality of switch means each having segmented fixed contacts and a movable contact coupled to said index bars and moved thereby to selectively engage said fixed contacts, said electrical circuit means including means connected to said movable contacts for applying a potential thereto and means connected to said fixed contacts for deriving signals therefrom which represent the amounts set up on said keyboard, said fixed contacts being so arranged that said movable contact engages only one fixed contact in response to the position of the associated bar corresponding to a low number and engages a plurality of fixed contacts in response to the position of said bar corresponding to a larger number.

6. A currency dispensing system including in combination, a machine having a digital keyboard on which amounts to be dispensed may be set up, and means operable to enter the amount in said machine including a plurality of movable members, each having a movement corresponding to one digit of the amount set up, and electrical circuit means including a plurality of switch means each having segmented fixed contacts and a movable contact means, said movable contact means of said switch means being individually coupled to said movable members and moved thereby to selectively engage said fixed contacts, said electrical circuit means including means connected to said movable contact means for applying a potential thereto and means connected to said fixed contacts for deriving signals therefrom which represent the amounts set up on said keyboard, said fixed contacts being so arranged that said movable contact means engages only one fixed contact in response to the position of the associated member corresponding to a low number and engages a plurality of fixed contacts in response to the position of said member corresponding to a larger number.

References Cited in the file of this patent

UNITED STATES PATENTS

| | | |
|---|---|---|
| 750,718 | Spear | Jan. 26, 1904 |
| 1,007,167 | Wickline | Oct. 31, 1911 |
| 1,017,447 | Nay | Feb. 13, 1912 |
| 1,166,499 | Von Barth | Jan. 4, 1916 |
| 1,197,101 | Broderick | Sept. 5, 1916 |
| 1,272,224 | Combs | July 9, 1918 |
| 1,356,379 | McDermott | Oct. 19, 1920 |
| 1,498,027 | Gaglizzo | June 17, 1924 |
| 1,648,774 | Maxwell | Nov. 8, 1927 |
| 1,699,540 | Magnus | Jan. 22, 1929 |
| 1,730,106 | White | Oct. 1, 1929 |
| 1,834,561 | Watson | Dec. 1, 1931 |
| 1,975,694 | Knotz | Oct. 2, 1934 |
| 2,075,247 | Wheeler | Mar. 30, 1937 |
| 2,127,642 | Dieserud | Aug. 23, 1938 |
| 2,189,641 | Slezak | Feb. 6, 1940 |
| 2,215,642 | Gabrielsen | Sept. 24, 1940 |
| 2,285,353 | Pierce | June 2, 1942 |
| 2,308,532 | Mills | Jan. 19, 1943 |
| 2,371,845 | Robison | Mar. 20, 1945 |
| 2,406,948 | Hoffman | Sept. 3, 1946 |
| 2,439,475 | Kruse | Apr. 13, 1948 |
| 2,547,102 | Wallach | Apr. 3, 1951 |
| 2,579,925 | Jackson | Dec. 25, 1951 |
| 2,605,774 | Damon | Aug. 5, 1952 |